(12) United States Patent
Kobayashi

(10) Patent No.: US 10,620,313 B2
(45) Date of Patent: Apr. 14, 2020

(54) ACTIVE SONAR AND CONTROL METHOD FOR ACTIVE SONAR

(71) Applicant: NEC Corporation, Minato-ku, Tokyo (JP)

(72) Inventor: Minoru Kobayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 379 days.

(21) Appl. No.: 15/615,979

(22) Filed: Jun. 7, 2017

(65) Prior Publication Data

US 2017/0371037 A1 Dec. 28, 2017

(30) Foreign Application Priority Data

Jun. 22, 2016 (JP) .................................. 2016-123200

(51) Int. Cl.
| | |
|---|---|
| *G01S 15/42* | (2006.01) |
| *G01S 15/02* | (2006.01) |
| *G01S 15/04* | (2006.01) |
| *G01S 15/66* | (2006.01) |
| *G01S 15/89* | (2006.01) |
| *G10K 11/00* | (2006.01) |

(52) U.S. Cl.
CPC ............ *G01S 15/42* (2013.01); *G01S 15/025* (2013.01); *G01S 15/04* (2013.01); *G01S 15/66* (2013.01); *G01S 15/89* (2013.01); *G10K 11/006* (2013.01)

(58) Field of Classification Search
CPC ........ G01S 15/42; G01S 15/025; G01S 15/04; G01S 15/66; G01S 15/89; G10K 11/006
See application file for complete search history.

(56) References Cited

U.S. PATENT DOCUMENTS

| | | | | |
|---|---|---|---|---|
| 5,359,334 A | * | 10/1994 | Gutman | ..................... G01S 1/56 342/158 |
| 5,420,827 A | * | 5/1995 | Feintuch | ................. G01S 11/14 367/127 |
| 6,198,692 B1 | * | 3/2001 | Sekine | ....................... G01S 7/62 367/11 |
| 6,445,646 B1 | * | 9/2002 | Handa | ................. G01S 7/52003 367/105 |

(Continued)

FOREIGN PATENT DOCUMENTS

| | | |
|---|---|---|
| JP | 2012-189499 A | 10/2012 |
| JP | 2015-222226 A | 12/2015 |

*Primary Examiner* — Krystine E Breier

(57) ABSTRACT

In order to acquire echo sound information about a long-distance target, an active sonar comprises a fan beam transmitter, a fan beam receiver, a propagation path calculator, a path time calculator, and a horizontal distance calculator. The active sonar transmits a plurality of transmitted fan beams horizontally wide and vertically narrow, and the elevation angles of them are mutually deferent, and receives received fan beams vertically wide and horizontally narrow. The propagation path calculator calculates a propagation path of each of the transmitted fan beams based on the profile of medium and the elevation angle of the transmission. The path time calculator calculates a path time which is the time period from the transmission to the reception. The horizontal distance calculator calculates a horizontal distance from the active sonar to a generation source point of each echo sounds based on the propagation path and the path time.

6 Claims, 14 Drawing Sheets

(56) References Cited

U.S. PATENT DOCUMENTS

| | | | | |
|---|---|---|---|---|
| 6,772,100 B2* | 8/2004 | Lipp | .................... | G01S 7/2813 |
| | | | | 342/148 |
| 7,362,655 B1* | 4/2008 | Hester | ...................... | G01S 5/06 |
| | | | | 367/124 |
| 2016/0131760 A1* | 5/2016 | Kozuki | ................... | G01S 7/521 |
| | | | | 367/102 |
| 2017/0031022 A1* | 2/2017 | Ivanov | ............... | G01S 15/8902 |
| 2017/0031023 A1* | 2/2017 | Ivanov | ............... | G01S 7/52003 |
| 2017/0350976 A1* | 12/2017 | Hauschildt | ............. | G01S 15/42 |

* cited by examiner

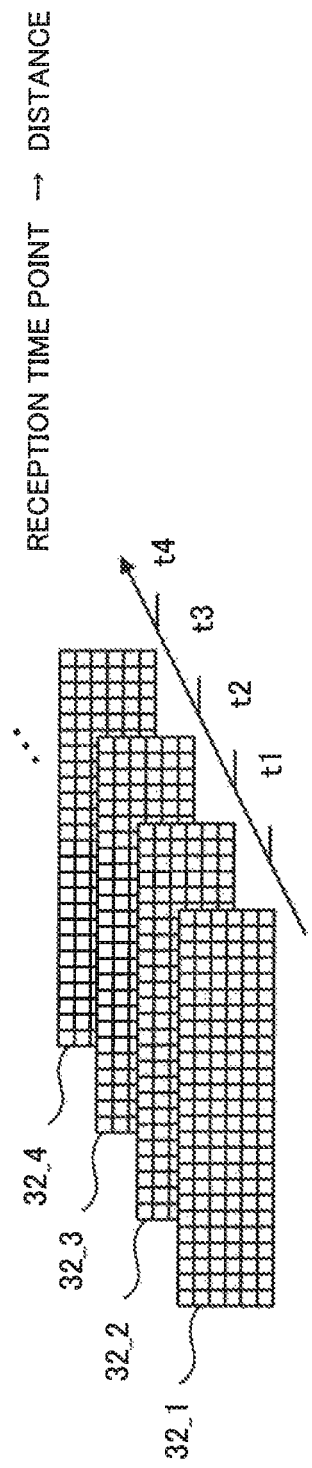

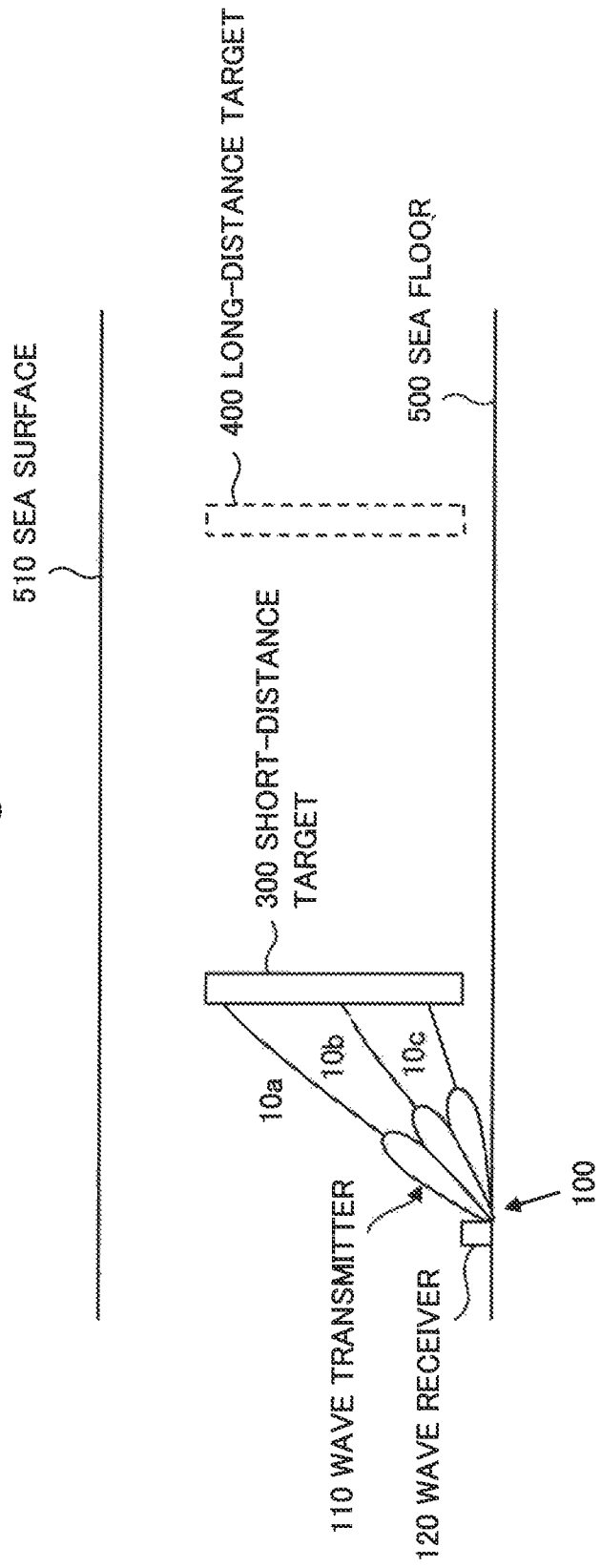

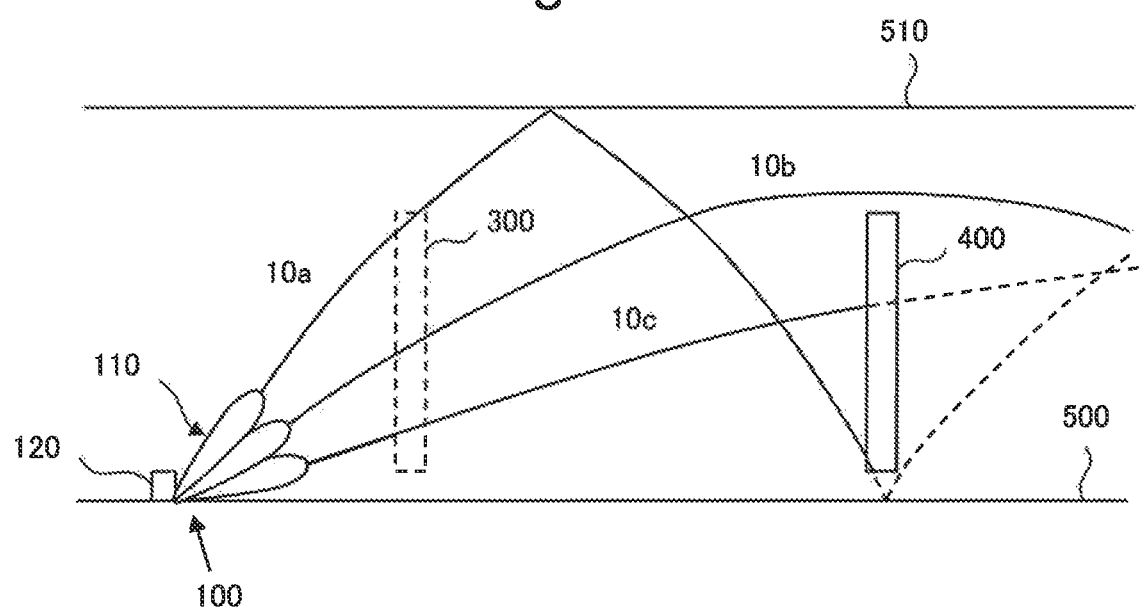

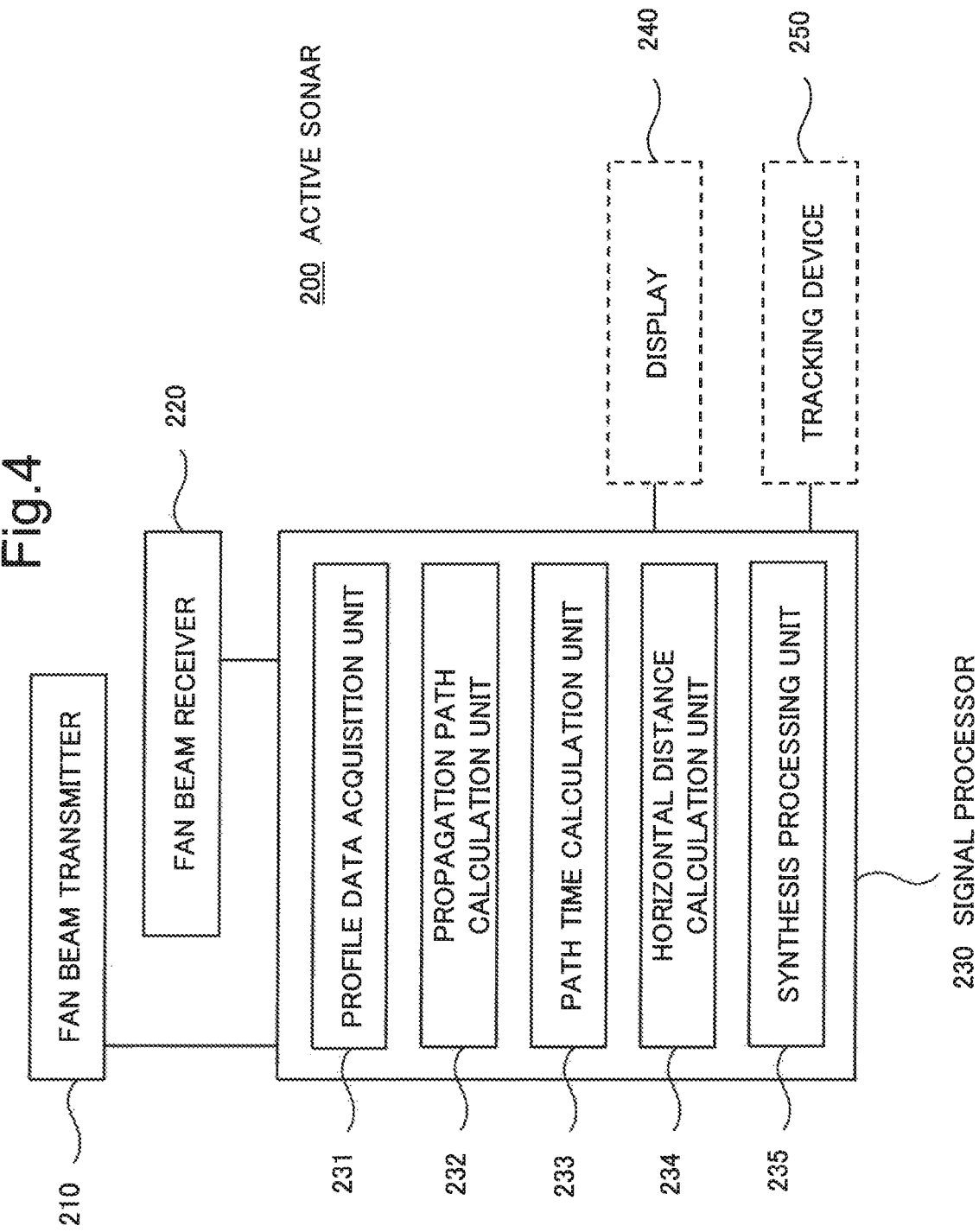

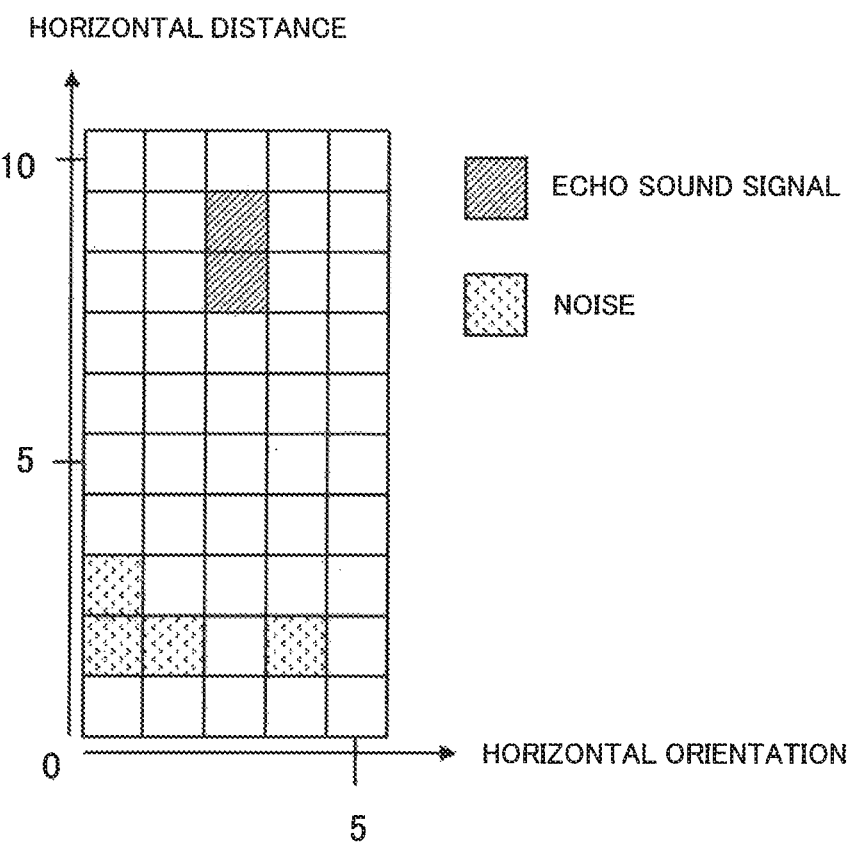

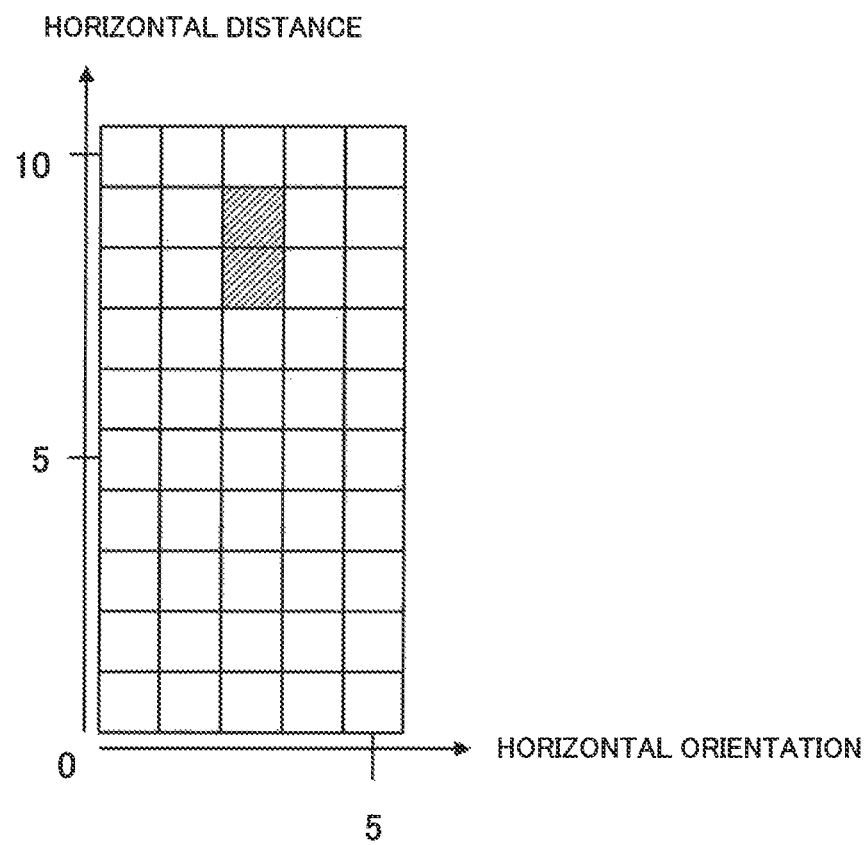

SYNTHESIS

NARROWING DOWN

ACTIVE SONAR AND CONTROL METHOD FOR ACTIVE SONAR

This application is based upon and claims the benefit of priority from Japanese Patent Application No. 2016-123200, filed on Jun. 22, 2016, the disclosure of which is incorporated herein in its entirety by reference.

TECHNICAL FIELD

The disclosed subject matter relates to an active sonar and a control method for the active sonar.

BACKGROUND ART

In underwater monitoring, an active sonar employing a cross fan beam method is known as a method for obtaining vertical-direction information of a target.

Such an active sonar employing the cross fan beam method which transmits transmitted fan beams, each transmitted fan beam is narrow in a vertical direction (i.e., a water depth direction) and wide in a horizontal direction. And the active sonar transmits a plurality of transmitted fan beams whose elevation angles are mutually different. And receives received fan beams, each being, reversely to the case of the transmitted fan beams, wide in the vertical direction and narrow in the horizontal direction. Such a configuration enables the active sonar to receive an echo sound having significantly high directivity from each of regions that is surrounded by vertical width of the transmitted fan beam and horizontal width of received fan beam. Further, synthesizing of such echo sound signals obtained from the respective regions enables to obtain two-dimensional information. Moreover, the visualization of this two-dimensional information enables the two-dimensional information to be utilized as a two-dimensional image, and also enables to form a three-dimensional shape of the target by using a plurality of such two-dimensional images. It is also known a method that modifies the frequency of the transmitted fan beams together with the elevation angle.

When the above-described cross fan beam method is simply used, there are some cases that accurate information cannot be obtained because of the modulations of the echo sounds or the interfusion of noises. In such background, efforts to eliminate the influence of these unfavorable factors to obtain an accurate information have been made.

For example, in patent document 1 (Japanese Unexamined Patent Application Publication No. 2015-22226), discloses a technique that corrects a frequency changes through the use of a Doppler effect. This technique enables to obtain the position and the velocity of a target by transmitting two kinds of transmitted fan beams, the one whose frequency is increasing along with the changes of its elevation angle, and the other one whose frequency is decreasing along with the changes of its elevation angle. Then the Doppler shift caused by the movement of the target is calculated, and the position and the velocity of the target can be calculated by using the Doppler shift.

Further, in patent document 2 (Japanese Unexamined Patent Application Publication No. 2012-189499) discloses a technique that can eliminate side lobes and multipath signals from a received signal through the use of the phase variance of the received signal. This technique eliminates side lobes and multipath signals by phasing a received signal, and calculating a variance of a received signal, and calculating the correlation between the phase variance and the amplitude of the received signal. Through these processes, the side lobes and the multipath echo sounds are removed. Here, the side lobes means signals that appear, as a result of beam foaming, in a direction different from the direction of a main lobe (a sound axis). And, the multipath signals means signals having arrived at a receiver after passing through a plurality of paths due to reflections or refractions.

SUMMARY

The use of the technique disclosed in patent document 1 or patent document 2 enables the acquisition of highly accurate information in relation to a short-distance target. In general cross fan beam methods, however, there has been a problem in that it is difficult to acquire information in relation to a long-distance target. In the case of the long-distance target, a plurality of transmitted fan beams transmitted at mutually different elevation angles propagate through mutually different propagation paths. This is because each transmitted fan beam is reflected or refracted in a deferent way depend on their elevation angle. As a result, for each transmitted fan beam, a difference occurs in the time to arrive at the same target. Further, there is a case where the correspondence between the elevation angles of the transmitted fan beams and the vertical relationship of the irradiation positions at the target arrival becomes unclear. For these reasons, the cross fan beam method has not been used in the acquisition of images of a long-distance target, and the application of the cross fan beam method has been limited to the acquisition of images of a short-distance target. Such a problem of the distance limitation has not been able to be eliminated even through the use of the techniques disclosed in patent documents 1 and 2.

The disclosed subject matter has been made in view of the above problem, and is intended to provide an active sonar capable of acquiring echo sound information in relation to a long-distance target.

In order to solve the above problem, an active sonar according to an aspect of the disclosed subject matter includes a fan beam transmitter, a fan beam receiver, a propagation path calculator, a path time calculator, and a horizontal distance calculator. The fan beam transmitter transmits a plurality of transmitted fan beams whose elevation angles are mutually deferent. Each transmitted fan beam spreading widely in a horizontal direction and spreading narrowly in a vertical direction. The fan beam receiver receives a plurality of received fan beams. Each received fan beam is spreading widely in the vertical direction and spreading narrowly in the horizontal direction. The propagation path calculator calculates a propagation path of each of the transmitted fan beams based on an acoustic velocity profile for a medium and the elevation angle of each of the transmitted fan beams. The path time calculator calculates a path time based on the time point of transmission of a transmitted fan beam and the receiving time point of the echo of the transmitted fan beam. The horizontal distance calculator calculates a horizontal distance from the active sonar to a generation source point of each of echo sounds based on the propagation path and the path time.

As described above, according to an aspect of the disclosed subject matter, an active sonar capable of acquiring echo sound information in relation to a long-distance target is provided.

BRIEF DESCRIPTION OF THE DRAWINGS

Exemplary features and advantages of the disclosed subject matter will become apparent from the following detailed description when taken with the accompanying drawings in which:

FIG. 2D is a schematic diagram illustrating received signals corresponding to a plurality of frames in the cross fan beam method;

FIG. 3A is a schematic diagram illustrating propagation paths of transmitted fan beams with respect to a short-distance target;

FIG. 3B is a schematic diagram illustrating propagation paths of transmitted fan beams with respect to a long-distance target;

FIG. 4 is a block diagram illustrating the configuration of an active sonar according to a second example embodiment;

FIG. 9A is a schematic diagram illustrating an example of an image display according to a fourth example embodiment;

FIG. 9B is a schematic diagram illustrating another example of the image display according of the fourth example embodiment;

EXAMPLE EMBODIMENT

Figure 1:
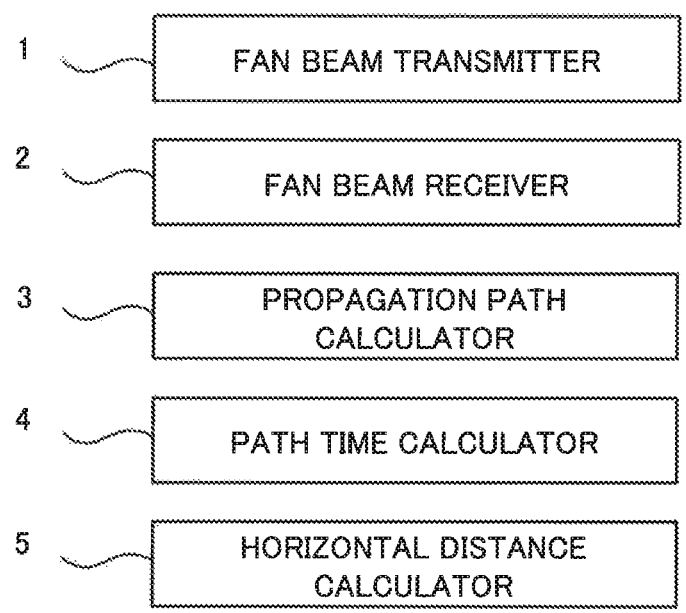
FIG. 1 is a block diagram illustrating the configuration of an active sonar according to a first example embodiment.

Hereinafter, example embodiments of the disclosed subject matter will be described in detail referring to the drawings. It should be noted, here, that example embodiments described below contain limitations that are technically preferable in the practice of the disclosed subject matter, but the scope of the disclosed subject matter is not limited to such example embodiments described below. Additionally, note that, in the description below, like constituent elements across figures are denoted by the same reference number, and thereby, the description of one or more of the like constituent elements may be omitted.

First Example Embodiment

FIG. 1 is a block diagram illustrating the configuration of an active sonar according to this first example embodiment.

The active sonar includes a fan beam transmitter 1, a fan beam receiver 2, a propagation path calculator 3, a path time calculator 4, and a horizontal distance calculator 5.

The fan beam transmitter 1 transmits each of transmitted fan beams spreading widely in a horizontal direction and spreading narrowly in a vertical direction, with the elevation angle of each of the of the transmitted fan beams set to a corresponding one of mutually different elevation angles.

The fan beam receiver 2 receives each of received fan beams spreading widely in the vertical direction and spreading narrowly in the horizontal direction.

The propagation path calculator 3 calculates a propagation path of each of the transmitted fan beams based on the elevation angle of each of the transmitted fan beams and the profile of a medium. A typical medium is water (fresh water or seawater), and the profile in this case includes various kinds of profile elements, such as a water pressure, a water temperature, and a salinity concentration. Further, an acoustic velocity profile regarding an acoustic velocity in a medium can be calculated from these kinds of profile elements. Further, acoustic velocities at each position in the medium is obtained from this acoustic velocity profile, and through the use of the obtained acoustic velocities, the propagation path of each of the transmitted fan beams can be calculated. The calculation of the propagation path can be performed in accordance with, for example, an acoustic ray theory employing the well-known Snell's law.

The path time calculator 4 calculates a path time that is a period of time from the transmission of each of the transmitted fan beams until the reception of each of echo sounds generated due to each of the transmitted fan beams. The path time corresponds to a period of time during which each of the transmitted fan beams and each of the echo sounds, which is included in one of the received fan beams that is associated with each of the transmission fan beams, propagate through the propagation path.

The horizontal distance calculator 5 calculates a horizontal distance from the active sonar to a generation point of each of the echo sounds (i.e., a target) based on the propagation path and the path time, which have been obtained through the two kinds of calculations.

As described above, the configuration according to the present example embodiment enables the acquisition of a horizontal distance from the active sonar to a generation point of each of the echo sounds. The acquisition can be done even though each of the transmitted fan beams and the received fan beam, which is associated with each of the transmitted fan beams, are subjected to reflections and/or refractions.

Thus, the active sonar according to the present example embodiment is capable of acquiring a position of a long-distance target.

Second Example Embodiment

Before the description of an active sonar according to this second example embodiment, the outline of the cross fan beam method will be described below.

Figure 2A:
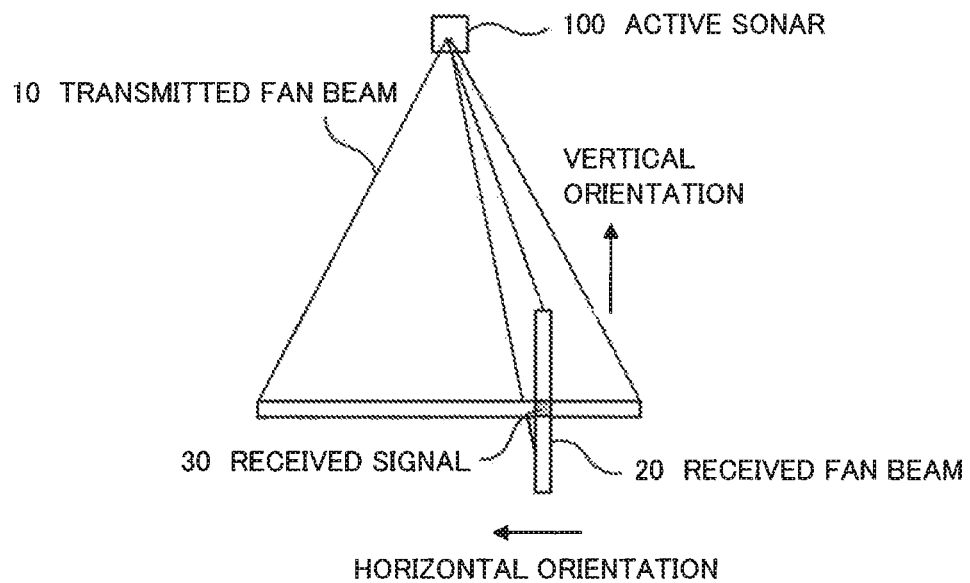
FIG. 2A is a schematic block diagram illustrating the outline of a cross fan beam method.
Figure 2B:
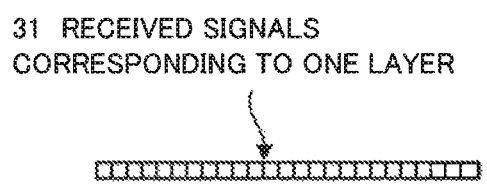
FIG. 2B is a schematic diagram illustrating received signals corresponding to one layer in the cross fan beam method.

FIG. 2A, 2B, 2C, 2D are schematic diagrams for use in the description of the outline of the cross fan beam method. Firstly, as shown in FIG. 2A, an active sonar 100 transmits a transmitted fan beam 10. This transmitted fan beam 10 is wide in the horizontal direction and narrow in the vertical direction. The active sonar 100 transmits each of a plurality of the transmitted fan beams 10. Each transmitted fan beam 10 is transmitted with the orientation of the elevation-angle direction set to a corresponding one of mutually different orientations. Hereinafter, one of the transmitted fan beams will be also referred to as one layer. Next, the active sonar 100 receives an echo sound through a received fan beam 20. This received fan beam 20 is wide in the vertical direction and narrow in the horizontal direction. Under such a configuration, one wave receiver of the active sonar 100 receives a received signal 30 from a cross point at which a transmitted fan beam and a received fan beam intersect with each other. Here, the received signal 30 has high directivity. Further, a plurality of such wave receivers are arranged in one horizontal orientation to obtain received signals 31. These received signals 31 correspond to one layer (FIG. 2B).

Figure 2C:
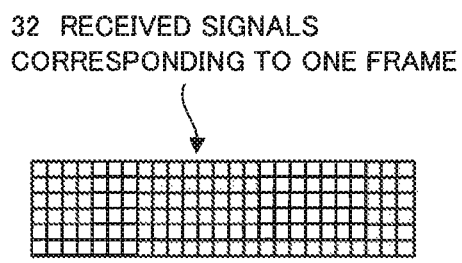
FIG. 2C is a schematic diagram illustrating received signals corresponding to one frame in the cross fan beam method.

Moreover, similar signals are acquired with respect to each of the transmitted fan beams 10, which have been transmitted toward the plurality of mutually different orientations, and reception time differences are corrected using transmission time differences to obtain received signals 32. These received signals 32 correspond to one frame (FIG. 2C). Here, the one frame is defined to be a range resulting from scanning the elevation angle of each of the transmitted fan beams 10 across one cycle.

A period of time from the transmission of a transmitted fan beam until the reception of an echo corresponding to the transmitted fan beam can be converted into a distance from the active sonar to a generation point of each of the echo sounds, through the use of an acoustic velocity in a medium.

Thus, three-dimensional information in relation to a target can be obtained through the use of a plurality of frames having been received at mutually different time points. FIG. 2D illustrates an example in which received signal frames 32_1, 32_2, 32_3, 32_4, . . . at time points t1, t2, t3, t4, . . . are arranged.

In the above description of the cross fan beam method, it is assumed that the upper/lower relations among the plurality of fan beams 10 are not reversed until the plurality of fan beams 10 arrive at the target (the echo sound generation point). This assumption corresponds to short-distance searching in which any reflection does not occur at the surface and the bottom of water. On the other hand, in the case where long-distance searching is performed, the received fan beams may penetrate through paths that are reflected at the surface and/or the bottom of water. Consequently, it is difficult to acquire accurate echo sound information in relation to a target merely by employing the same method as a general cross fan beam method.

The above situation will be described using a specific example. FIG. 3A is a schematic diagram illustrating a situation in which a short-distance target 300 exists, and FIG. 3B is a schematic diagram illustrating a situation in which a long-distance target 400 exists. An active sonar 100 is disposed on the sea floor 500 in each configuration. Here, three transmitted fan beams are illustrated. The transmitted fan beams are transmitted in the mutually deferent elevation angles. The transmitted fan beams are denoted by 10a, 10b, and 10c in descending order of the elevation angles. Further, the received fan beams from a target are received by a wave receiver 120. Here wave transmitter 110 is a part of a fan beam transmitter, wave receiver 120 is a part of a fan beam receiver.

As shown in FIG. 3A, in the case where the target is located at a short distance position, three transmitted fan beams 10a, 10b, and 10c arrive at the short-distance target 300 while keeping the upper/lower relations among the elevation angles. The wave receiver 120 receives the echo sounds by received fan beams. Each received fan beam propagates through the same propagation path as that of a corresponding transmitted fan beam.

Thus, accurate echo sound information in relation to the short-distance target 300 can be obtained merely by correcting the reception time differences among received signals using transmission time differences.

On the other hand, in the case of FIG. 3B, in which the target is the long-distance target 400, each of transmitted fan beams 10a, 10b, and 10c respectively propagate through greatly deferent propagation paths depend on the elevation angles due to reflections and/or refractions. In the example shown in FIG. 3B, the transmitted fan beam 10a is reflected at a sea surface 510 and then arrives at a lower portion of the long-distance target 400. Further, the transmitted fan beam 10b does not hit onto the long-distance target 400, and the transmitted fan beam 10c hits onto a portion near the center of the long-distance target 400. As described above, in the case of the long-distance target 400, the associations between the upper/lower relations among the elevation angles and upper/lower relations among the propagation paths are not kept, and thus, large amount of information is not obtained unlike the case of the short-distance target 300. In this case, however, the configuration allows improving a probability of an acquisition of the long-distance target. Because transmitting transmitted fan beams having mutually different elevation angles reduces a shadow zone at which any one of the transmitted fan beams does not arrive.

Next, an active sonar according to the present example embodiment will be described. FIG. 4 is a block diagram illustrating the configuration of the active sonar according to the present example embodiment. An active sonar 200 includes a fan beam transmitter 210, a fan beam receiver 220, and a signal processor 230.

The fan beam transmitter 210 transmits a transmitted fan beam having a wide spread in the horizontal direction and a narrow spread in the vertical direction. At this time, the fan beam transmitter 210 transmits a plurality of the transmitted fan beams with mutually different elevation angles.

The fan beam receiver 220 receives received fan beams each having been subjected to beam forming so as to have a wide spread in the vertical direction and a narrow spread in the horizontal direction.

The signal processor 230 acquires echo sound information in relation to echo sounds from a target on the basis of received signals included in the received fan beams. In order to achieve this acquisition, the signal processor 230 includes a profile data acquisition unit 231, a propagation path calculation unit 232, a path time calculation unit 233, a horizontal distance calculation unit 234, and a synthesis processing unit 235.

The profile data acquisition unit 231 acquires various kinds of profile data about a medium for fan beams, such as seawater. The profile data includes, for example, water temperature profile data, salinity profile data, and seafloor topography data. These kinds of profile data can be acquired from measurement tools or databases.

The propagation path calculation unit 232 calculates the propagation path of each of the transmitted fan beams and the received fan beams based on the various kinds of profile data having been acquired by the profile data acquisition unit 231 and the elevation angles of the respective transmitted fan beams. The calculation at this time can be performed by, for example, obtaining acoustic velocities at individual positions based on the profile data and applying the acoustic velocities to an acoustic ray theory employing the Snell's law. Here, it is assumed that each of the transmitted fan beams and a received fan beam corresponding to each of the transmitted fan beams propagate through the same propagation path.

The path time calculation unit 233 calculates a path time from a time point at which each of the transmitted fan beams is transmitted until a time point at which each of echo sounds corresponding to each of the transmitted fan beams is received by the receiver.

The horizontal distance calculation unit 234 calculates a horizontal distance from the active sonar 200 to an echo sound generation point of each of the echo sounds based on the propagation path and the path time. A method for the calculation of the horizontal distance will be described later.

The synthesis processing unit 235 synthesizes signals from same horizontal distance and orientation. The horizontal distances are calculated by the horizontal distance calculation unit 234. At this time, the grouping of signals may be performed based on only the horizontal orientations of the signals without taking the vertical orientations of the signals into consideration. This is because it is difficult to acquire detailed information in relation to the vertical orientations of the signals. Since, as having been mentioned in the description of FIG. 3B, the upper/lower relations among the propagation paths are interchanged along with the increase of the distance, and the shadow zone exists. Further, the synthesis processing unit 235 may output synthesized data as echo sound data corresponding to the relevant orientation and the relevant horizontal distance. The echo sound data having been output can be utilized in various situations, such as displaying on a display 240 or inputting into a tracking device 250.

Figure 5:
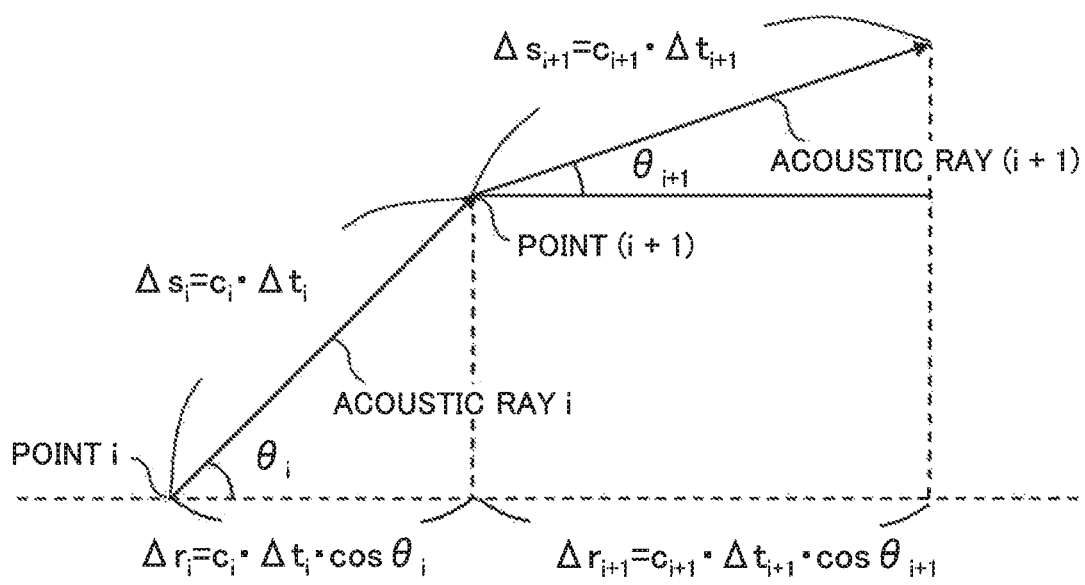
FIG. 5 is a diagram illustrating a method for calculating a horizontal distance based on a propagation path.

Next, the method for the calculation of the horizontal distance will be described. FIG. 5 is a diagram illustrating the relation between an acoustic ray and a horizontal distance at each of points when a propagation path has been separated into minute sections. Each straight line with an arrow represents a corresponding acoustic ray, and an acoustic ray at a point i and an acoustic ray at a point (i+1) are respectively denoted by an acoustic ray i and an acoustic ray (i+1). Further, an elevation angle (an angle relative to a horizontal plane) at the point i and an elevation angle at the point (i+1) are respectively denoted by an elevation angle $\theta_i$ and an elevation angle $\theta_{i+1}$, and an acoustic velocity at the point i and an acoustic velocity at the point (i+1) are respectively denoted by an acoustic velocity $c_i$ and an acoustic velocity $c_{i+1}$.

Here, the acoustic velocity c is expressed as a function of a position and is calculated, for each point, from the profile data. The elevation angle θ is obtained from acoustic velocities at both sides of a boundary based on the Snell's law. Further, a distance along an acoustic ray is denoted by s; a horizontal distance is denoted by r; and a period of time is denoted by t.

When a distance (the length of an acoustic ray) by which an acoustic wave proceeds at the i point during a minute time $\Delta t_i$ is denoted by $\Delta s_i$, and a horizontal distance by which the acoustic wave proceeds at this time is denoted by $\Delta r_i$, the following two formulas are satisfied.

$$\Delta s_i = c_i \cdot \Delta t_i \quad (1)$$

$$\Delta r_i = c_i \cdot \Delta t_i \cdot \cos \theta_i \quad (2)$$

Similarly, for the sound ray at the (i+1) point, the following two formulas are satisfied.

$$\Delta s_{i+1} = c_{i+1} \cdot \Delta t_{i+1} \quad (3)$$

$$\Delta r_{i+1} = c_{i+1} \cdot \Delta t_{i+1} \cdot \cos \theta_{i+1} \quad (4)$$

Similarly, a horizontal distance corresponding to a distance by which the acoustic wave proceeds at each of points on the propagation path during a minute time corresponding to each of the points can be calculated. Here, a path time, that is, a period of time from the transmission of a certain transmitted fan beam until the reception of a corresponding echo sound, is denoted by T, and a horizontal distance to a target that is an echo sound generation point is denoted by R.

In this case, since the path time is a period of time during which an acoustic wave reciprocates, T is twice the sum of Δt having been described above. Thus, $\Delta t_i$ should be added so as to allow the following formula to be satisfied.

$$T = 2 \sum_{i=1}^{n} \Delta t_i \quad (5)$$

A number n, that is, the total number of pieces of data to be added, is obtained from the formula (5). Thus, the horizontal distance R to the target is obtained by summing n pieces of the minute horizontal distance $\Delta r_i$. That is, the horizontal distance R can be represented by the following formula.

$$R = \sum_{i=1}^{n} \Delta r_i \quad (6)$$

Through the above calculations, a horizontal distance to a generation source point of each received signal can be obtained.

Further, an echo sound signal from the position of a specific horizontal orientation and a specific horizontal distance can be obtained by synthesizing the signals from the same orientation and the same distance among the different received fan beams.

Figure 6:
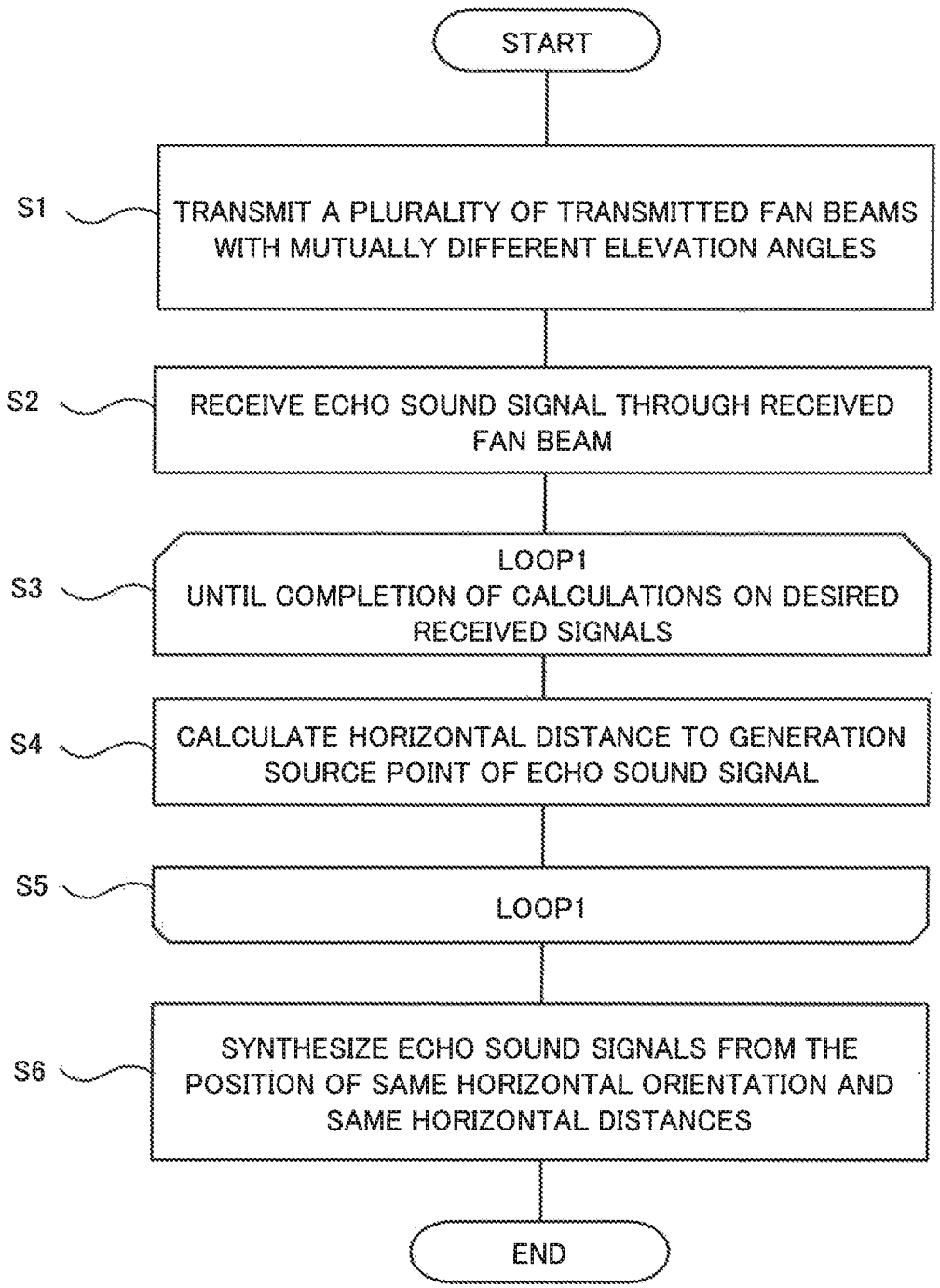
FIG. 6 is a flowchart illustrating the operation of the active sonar according to the second example embodiment.

Next, the operation of the active sonar will be described. FIG. 6 is a flowchart illustrating the operation of the active sonar.

First, the fan beam transmitter transmits a plurality of the transmitted fan beams with mutually different elevation angles (S1). Next, the fan beam receiver receives echo sound signals through a received fan beam corresponding to each of the transmitted fan beams (S2). Next, the signal processor calculates horizontal distance to the generation source point of each of the echo sound signals. This calculation is repeatedly performed until the completion of the calculations on desired received signals (loop 1, S3 to S5). Further, the signal processor synthesize the echo sound data whose generation source points are located in the same orientations and same horizontal distances (S6).

As described above, the configuration according to the present example embodiment enables the acquisition of a target located at a long-distance position through the use of the cross fan beam method.

Third Example Embodiment

Figure 7:
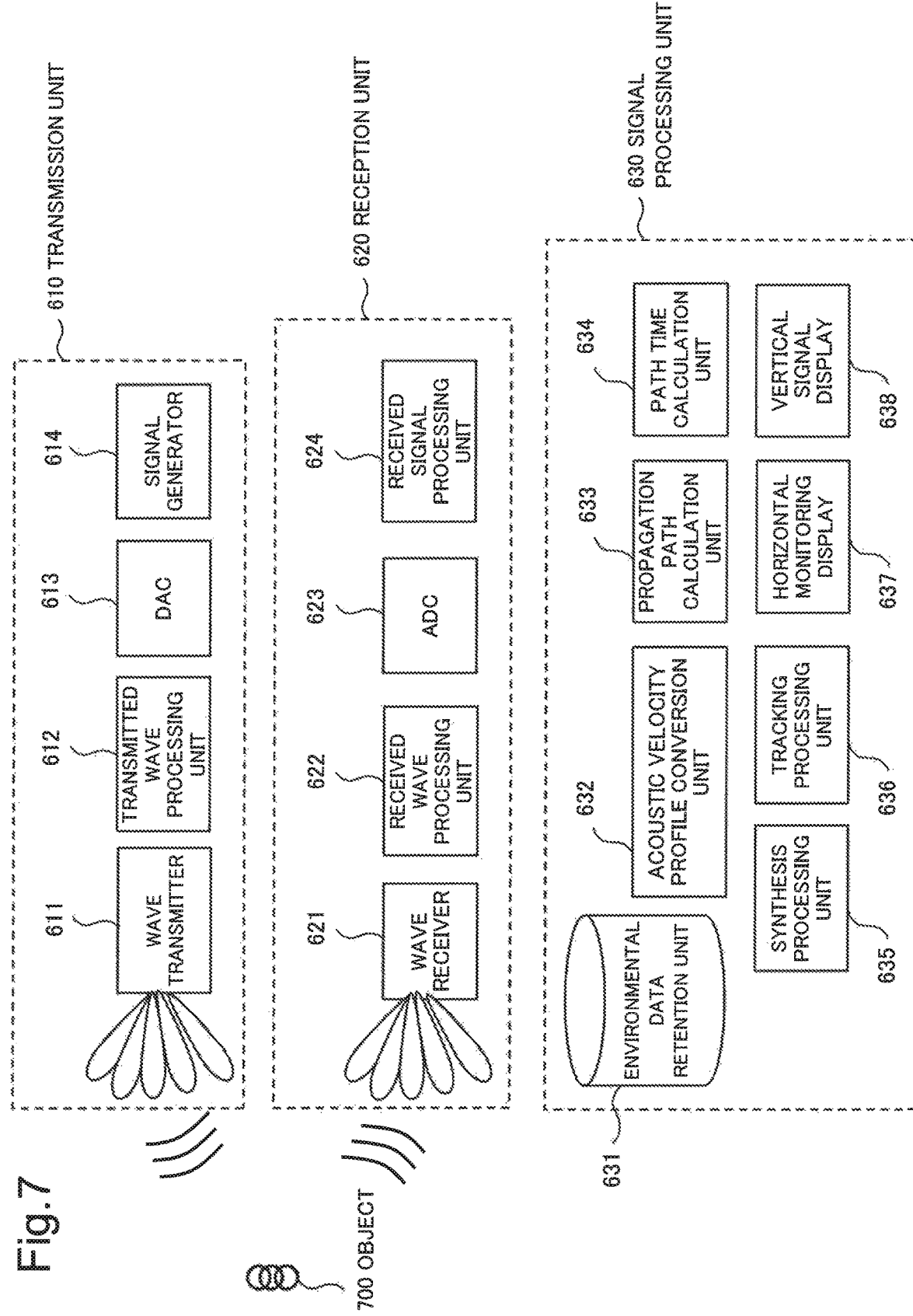
FIG. 7 is a block diagram illustrating the configuration of an active sonar according to a third example embodiment.

In this example embodiment, a specific and detailed configuration example of the active sonar will be described. FIG. 7 is a block diagram illustrating an example of the configuration of the active sonar according to this third present example embodiment. The active sonar includes a transmission unit 610, a reception unit 620, and a signal processing unit 630.

The transmission unit 610 includes a wave transmitter 611, a transmitted wave processing unit 612, a DAC 613, and a signal generator 614. Here, the DAC means a digital-to-analog converter.

The wave transmitter 611 converts an electrical signal into an acoustic wave signal, and transmits the acoustic wave signal into the water. The transmitted wave processing unit 612 cuts high frequency noise of a digital signal, and amplifies the electrical signal. The DAC 613 converts the digital signal output from the signal generator 614 into an analog signal. The signal generator 614 generates a digital waveform, such as a PCW (Pulsed Continuous Wave) or an LFM (Linear Frequency Modulation). The wave transmitter 611 transmits a plurality of transmitted fan beams having mutually different elevation angles.

The reception unit 620 includes a wave receiver 621, a received wave processing unit 622, an ADC 623, and a received signal processing unit 624. Here, the ADC means an analog-to-digital converter.

The wave receiver 621 receives an acoustic wave, and converts the received acoustic wave into an electrical signal. The received wave processing unit 622 amplify the electrical signals output from the wave receiver 621 and filtering the signals to eliminate the bands other than a needed band. The ADC 623 converts an analog signal output from the received wave processing unit 622 into a digital signal. The received signal processing unit 624 performs signal processing, such as a baseband conversion process, a phasing process, an AGC (Automatic Gain Control) process, a pulse compression process, and an automatic detection process, on the output of the ADC 623.

The signal processing unit 630 includes an environmental data retention unit 631, an acoustic velocity profile conversion unit 632, a propagation path calculation unit 633, a path time calculation unit 634, a synthesis processing unit 635, a tracking processing unit 636, a horizontal monitoring display 637, and a vertical signal display 638. The environmental data retention unit 631 retains environment data, such as water temperature profile data observed by a water temperature measurement tool or the like through the use of the relations between water depths and water temperatures, salinity profile data observed by a salinity measurement tool or the like, and seafloor topography data. The acoustic velocity profile conversion unit 632 converts a water temperature profile and a salinity profile into an acoustic velocity profile represented by the relations between water depths and acoustic velocities. The propagation path calculator 633 calculates a propagation path based on the acoustic velocity profile output from the acoustic velocity profile conversion unit 632 and the seafloor topography data input from the environmental data. The path time calculation unit 634 calculates a path time of a fan beam based on the elevation angle and the respective propagation path which have been calculated by the propagation path calculation unit 633. The synthesis processing unit 635 calculates a horizontal distance from the active sonar to each of the echo sound generation points based on the calculated propagation path and the path time, and performs synthesis processing on detection results output from the received signal processing unit 624 based on the calculated horizontal distance.

The tracking processing unit 636 associates pieces of data with one another based on the synthesized detection results of the synthesis processing unit 635 and predicts next movement of the target. In the tracking processing, time-series of the predicted positions of a moving target are calculated by means of a state estimation method, such as a Kalman filter or a particle filter, and further, refine the estimated position by taking correlations among a plurality of predicted positions.

The horizontal monitoring display 637 displays the tracking results of the tracking processing unit 636 as a horizontal figure. The vertical signal display 638 vertically displays acoustic data output from the synthesis processing unit 635 by means of a cross fan beam method.

Figure 8:
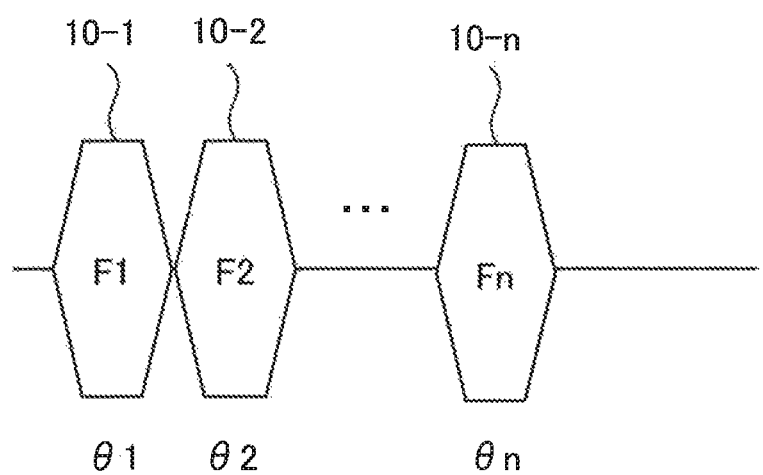
FIG. 8 is a timing chart of transmitted waveforms.

Next, the operation of the active sonar will be described. First, the signal generator 614 forms a digital waveform which is effective for a sonar. A waveform image at this time is assumed to be, for example, a waveform shown in FIG. 8. It is assumed here that the wave transmitter transmits pulses which comprises transmitted fan beam 10-1 having a frequency F1 and an elevation angle θ1, a transmitted fan beam 10-2 having a frequency F2 and an elevation angle θ2, . . . , and a transmitted fan beam 10-n having a frequency Fn and an elevation angle θn. With respect to the waveform, for example, a pulse waveform having a single frequency, such as a PCW or an LFM, can be used, but the present example embodiment does not depend on the waveform. This is because, even if any other waveform such as a phase modulation waveform or a non-linear frequency modulation waveform is employed, obtained output data (position data in relation to distances and orientations) are not changed, only the content of processing performed by the received signal processing unit 624 is changed. As shown in the example of FIG. 8, the waveforms of the pulses are waveforms in accordance with the cross fan beam method, and the pulses are individually transmitted into the water, the elevation angles of these pulses are n type of angles. At this time, in the case where the waveforms of the pulses are PCW, the pulses' frequencies are changing in n patterns of frequencies, F1 to Fn, corresponding to the elevation angles. Further, in the case where the waveforms of the pulses are modulation waveforms having bands, such as an LFM, the central frequency of the pulses are changing in n patterns of frequencies F1 to Fn. At this time, for any kind of waveform having a band, such as the PCW and the LFM, it is desirable to select the individual frequencies F1 to Fn to prevent the interference among received signals due to Doppler shifting.

When a transmission frequency is denoted by Fn; the maximum velocity of an target is denoted by V; and an underwater acoustic velocity is denoted by C, an obtained Doppler shift amount ΔF of the target is represented by the following formula.

$$\Delta F = \frac{2VFn}{C-V} \qquad (7)$$

In the transmission of the fan beams, a transmission time point of each transmission elements of wave transmission unit 611 (for example, L elements) should be delayed in accordance with the value of each of transmission elevation angles. Here, it is assumed that the number of the transmission elevation angles is two or more.

Further, digital waveforms having been generated by the signal generator 614 are converted by the DAC 613 into L analog signals each associated with a corresponding one of the L elements included in the wave transmitter 611. The L transmitted signals having been converted into the analog signals are each subjected to analog filtering by the transmitted wave processing unit 612 so as to allow only its transmission frequency band (a band resulting from adding a modulation bandwidth to each of the frequencies F1 to Fn)

to be passed. Further, the amplitudes of the transmitted signals are amplified by power amplifiers, and then, the transmitted signals are input into the wave transmitter 611. The wave transmitter 611 is constituted by a plurality of wave transmission elements arranged in the vertical direction. Each of the wave transmission elements converts a corresponding one of the electrical signals output from the transmitted wave processing unit 612 into a corresponding one of acoustic waves. Thereafter, each transmission elements transmits a transmitted fan beam with the respective elevation set by vertical beam shifting into the water. Each of the transmitted fan beams having been transmitted into the water propagates toward a target 700.

Meanwhile, reflection waves having been reflected at the target 700 are received and converted into electrical signals by M wave reception elements included in the wave receiver 621. The electrical signals output from the wave receiver 621 are amplified in the received wave processing unit 622. Further, the received wave processing unit 622 performs a filtering process to eliminate bands other than a reception band for the electrical signals. Here, the reception bandwidth is generally wider than a transmission bandwidth. The filtered electrical signals are input into the ADC 623. The ADC 623 converts each of the M analog signals into a corresponding one of digital signals by performing level quantization and temporal sampling on the M analog signals. The digital signals are converted into baseband signals by the received signal processing unit 624 to lower the sampling rate, and then are separated into n bands that are divided in accordance with the elevation angles by filters. The received signal processing unit 624 performs phasing process for the separated M pieces of received data so as to the received data being converted into horizontal beams. Hereinafter, received signals corresponding to n kinds of elevation angles will be referred to as a layer 1, a layer 2, . . . , and a layer n.

When the waveform is any other modulation waveform, such as the LFM, pulse compression processing is performed. The pulse compression process have a procedure of taking the correlation of time point of each element of received signals with the corresponding transmitted signal. Moreover, the absolute level is converted into a corresponding relative level through AGC (Automatic Gain Control) processing, since the absolute levels of each of the received signals greatly varies in accordance with the distance of its propagation path. Through the processes having been described so far, the received signals having been obtained by the wave receiver 621, constituted by the M elements, are converted, for each of n layers of bands, into pieces of position data constituted by an array consisting of rows each associated with a corresponding one of a plurality of horizontal beams (whose number is denoted by N) and columns each associated with a corresponding one of P distances in a distance direction. Here, each of the pieces of position data is denoted by (an orientation number N, a distance number P). That is, n represents the number of vertical planes whose angles toward the vertical direction are made different from one another, and for each of the vertical planes, pieces of received data constituted by grid squares forming a P×N array are obtained. At this time, the total number of all of the pieces of received data is equal to a number obtained by performing a multiplication operation: n (kinds)*P (distances)*N (orientations).

Next, the signal processing unit 630 will be described. The environmental data retention unit 631 retains environmental data that is observed in advance, such as a water temperature profile and a salinity profile, and inputs these kinds of data into the acoustic velocity profile conversion unit 632. A formula for the conversion of an acoustic velocity is associated with a water temperature and a salinity level, and some conversion formulas (for example, an acoustic velocity formula by SOOP) are known. The disclosed subject matter, however, does not depend on the kind of such an acoustic velocity conversion formula. The acoustic velocity profile is input to the propagation path calculator 633. The calculation of the propagation path is performed in accordance with, for example, an acoustic ray theory employing the well-known Snell's law. A propagation path is calculated for each of the layers n. The path time calculator 634 calculates path time sets T1, T2, . . . , and Tn corresponding to the respective n layers based on a transmission time point of each of the transmitted fan beams and a reception time point of each of echo sound signals corresponding to each of the transmitted fan beams, and inputs the results into the synthesis processing unit 635. The synthesis processing unit 635 calculates a horizontal distance to the generation source point of each of the received signals based on the calculation results of the propagation paths and the path times. Further, the synthesis processing unit 635 synthesizes pieces of data included in a corresponding one of the n layers which have the same horizontal direction and the same horizontal distance. Moreover, pieces of data each resulting from this synthesis process are input to the tracking processing unit 636.

As described above, the configuration according to the present example embodiment enables not only the acquisition of echo sound information in relation to a long-distance target through the use of the cross fan beam method, but also the utilization in tracking processing and the like.

Fourth Example Embodiment

In the present example embodiment, processes from the received signal processing unit 624 to the tracking processing unit 636 shown in FIG. 7 will be described in detail. Here, it is assumed that an image having five horizontal beams (horizontal orientations) and ten sections for the horizontal distance is obtained. A specific example of the image is illustrated in FIG. 9A. Signals forming this image include noise and reverberations. Thus, the received signal processing unit 624 performs automatic detection processing for detecting the signals and eliminating the noise and the reverberations using a signal level threshold value, a signal length, and the like. Through this processing, signals resulting from the elimination of the noise is obtained. FIG. 9B is an example image of the signals.

Figure 10A:
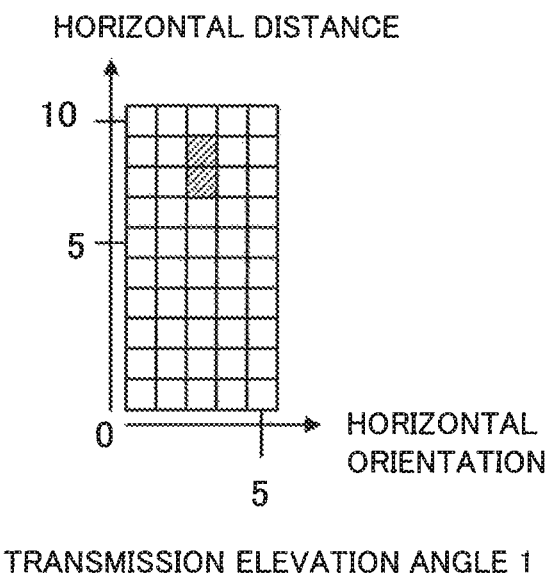
FIG. 10A is a schematic diagram illustrating an example of an image corresponding an elevation angle 1, according to the fourth example embodiment.
Figure 10B:
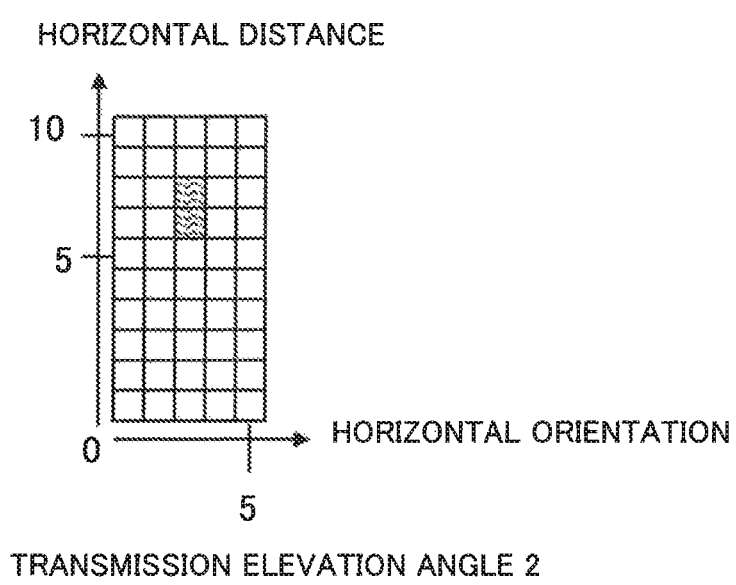
FIG. 10B is a schematic diagram illustrating an example of an image corresponding an elevation angle 2, according to the fourth example embodiment.
Figure 10C:
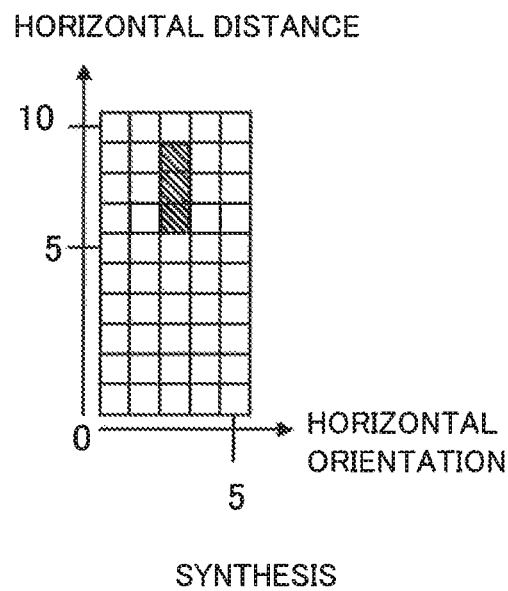
FIG. 10C is a schematic diagram illustrating an example of a synthesized image according to the fourth example embodiment.
Figure 10D:
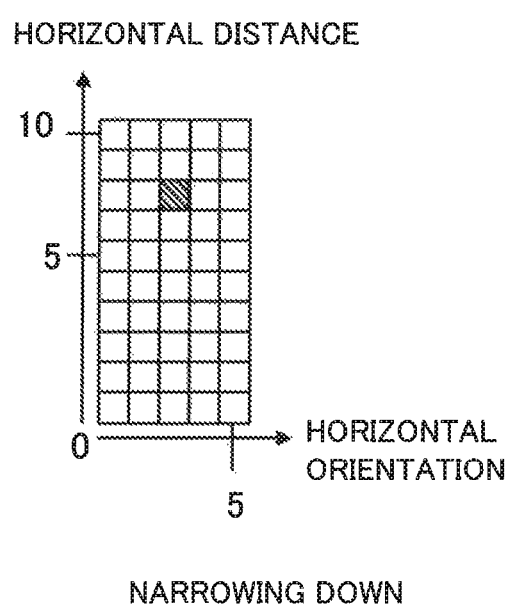
FIG. 10D is a schematic diagram illustrating an example of a synthesized image resulting from image processing, according to the fourth example embodiment.

Next, the received signal processing unit 624 outputs signals having been subjected to the above-described processing to the synthesis processing unit 635. The synthesis processing unit 635 performs processing for synthesizing groups of pieces of data each of which is included in a corresponding one of the mutually different layers and which have the same horizontal orientation and the same horizontal distance. A specific examples are illustrated in FIG. 10A and FIG. 10B. Here, it is assumed that the process synthesize data of two layers that consists of a layers corresponding to a transmission elevation angle 1 and a layer corresponding to transmission elevation angle 2. Further, it is assumed that each pixel is denoted by a format (a horizontal orientation number, a horizontal distance number). Signals exist at two points (3, 8) and (3, 9) in the image of FIG. 10A corresponding to the transmission elevation angle 1. Similarly, signals exists at two points (3, 7) and (3, 8) in the image of FIG. 10B corresponding to the transmission elevation angle 2. Thus, in the image of FIG. 10C that illustrates an image resulting from synthesizing these images, signals exist at three points (3, 7), (3, 8), and (3, 9). Here, it is considered that a certain degree of error is included in the horizontal distance having been obtained through the calculation. Thus, narrowing down of the estimated position of the target may be possible on a presumption that data overlapped points of the two images may has high certainty as an actual position of the target. FIG. 10D shows an example image of the input data to the tracking processing unit 636. Here, it is simply assumed that data which has overlap in the synthesized image should be employed. Thus data of (3, 8) is employed as input data of the image shown in FIG. 10D.

As described above, this configuration enables the acquisition of echo sound data with a higher certainty, in the case where signals from the same target can be acquired through the deferent fan beams whose elevation angles and propagation paths are mutually deferent. That is, this configuration enables the enhancement of the probability of detecting of a desired target.

As described above, the configuration according to the present example embodiment enables monitoring throughout a wide range spreading from short distance to long distance and spreading from a sea surface to a sea floor, and eliminates or minimizes omissions of detection of a moving target.

A program that allows a computer to execute the above-described processes according to the first to fourth example embodiments and a recording medium that stores in itself the program are also included in the scope of the present invention. For the recording medium, for example, a magnetic disc, a magnetic tape, an optical disc, a magneto-optical disk, or a semiconductor memory device may be used.

The previous description of embodiments is provided to enable a person skilled in the art to make and use the present invention. Moreover, various modifications to these example embodiments will be readily apparent to those skilled in the art, and the generic principles and specific examples defined herein may be applied to other embodiments without the use of inventive faculty. Therefore, the present invention is not intended to be limited to the example embodiments described herein but is to be accorded the widest scope as defined by the limitations of the claims and equivalents.

Further, it is noted that the inventor's intent is to retain all equivalents of the claimed invention even if the claims are amended during prosecution.

The invention claimed is:

1. An active sonar comprising:
   a fan beam transmitter configured to transmit a plurality of transmitted fan beams spreading widely in horizontal direction and spreading narrowly in vertical direction, elevation angles of the transmitted fan beams are mutually different;
   a fan beam receiver configured to receive a plurality of received fan beams spreading widely in vertical direction and spreading narrowly in horizontal direction;
   a propagation path calculator configured to calculate a propagation path of each of the transmitted fan beams based on the elevation angles of each of the transmitted fan beams and a profile of medium;
   a path time calculator configured to calculate a path time that is a time period from a time point at which the fan beam transmitter transmits each of the transmitted fan beams until a time point at which the fan beam transmitter transmits each of the transmitted fan beams until
   a time point at which the fan beam receiver receives echo sound signals corresponding to each of the transmitted fan beams; and
   a horizontal distance calculator configured to calculate a horizontal distance from a generation source point of each of the echo sound signals to the fan beam receiver based on the propagation path and the path time,
   wherein the horizontal distance calculator
   calculates a propagation-path length along the propagation path from the generation source point of each of the echo sound signals to the fan beam receiver based on the path time,
   calculates the horizontal distance from the generation source point of each of the echo sound signals to the fan beam receiver based on the propagation-path length, and
   calculates the horizontal distance based on elevation angles of the propagation path in minute regions and horizontal distance which correspond to the minute regions.

2. The active sonar according to claim 1, further comprising a synthesis processing unit configured to synthesize pieces of echo sound signals each of which having been come from approximately same orientation and approximately same distance and correspond to different transmitted fan beams having mutually deferent elevation angles in a predetermined rule.

3. A control method for an active sonar, the control method comprising:
   transmitting a plurality of transmitted fan beams spreading widely in a horizontal direction and spreading narrowly in a vertical direction, elevation angles of the transmitted fan beams are mutually different;
   receiving a plurality of received fan beams spreading widely in a vertical direction and spreading narrowly in horizontal direction;
   calculating a propagation path of each of the transmitted fan beams based on the elevation angles of each of the transmitted fan beams and a profile of medium;
   calculating a path time that is a time period from a transmission of each of the transmitted fan beams until a reception of each of echo sound signals corresponding to each of the transmitted fan beams; and
   calculating a horizontal distance from a generation source point of each of the echo sound signals to a fan beam receiver of the active sonar based on the propagation path and the path time,
   calculating a propagation-path length along the propagation path from the generation source point of each of the echo sound signals to the fan beam receiver based on the path time,
   calculating horizontal distance from the generation source point of each of the echo sound signals to the fan beam receiver based on the propagation-path length, and
   calculating the horizontal distance based on elevation angles of the propagation path in minute regions and horizontal distance which correspond to the minute regions.

4. The control method for an active sonar, according to claim 3, further comprising
   synthesizing pieces of echo sound signals each of which having been come from approximately same orientation and approximately same distance and correspond to different transmitted fan beams having mutually different elevation angles in a predetermined rule.

5. A program storage medium that stores in itself a control program for an active sonar, the control program comprising:
- a step of transmitting a plurality of transmitted fan beams spreading widely in horizontal direction and spreading narrowly in vertical direction, elevation angles of the transmitted fan beams are mutually different;
- a step of receiving a plurality of received fan beams spreading widely in vertical direction and spreading narrowly in horizontal direction;
- a step of calculating a propagation path of each of the transmitted fan beams based on the elevation angle of each of the transmitted fan beams and a profile of medium;
- a step of calculating a path time that is a period of time from a transmission of each of the transmitted fan beams until a reception of each of echo sound signals corresponding to each of the transmitted fan beams;
- a step of calculating a horizontal distance from a generation source point of each of the echo sound signals to a fan beam receiver of the active sonar based on the propagation path and the path time;
- a step of calculating a horizontal distance from a generation source point of each of the echo sound signals to a receiver for one of the echo sound signals that is associated with each of the echo sound based on the propagation paths and the path times;
- a step of calculating the horizontal distance based on elevation angles of the propagation path in minute regions and horizontal distance which correspond to the minute regions;
- a step of calculating a propagation-path length along the propagation path from the generation source point of each of the echo sound signals to the fan beam receiver based on the path time; and
- a step of calculating the horizontal distance from the generation source point of each of the echo sound signals to the fan beam receiver based on the propagation-path length.

6. The program storage medium, according to claim 5, wherein the control program further comprises
- A step of synthesizing pieces of echo sound signals each of which having been come from approximately same orientation and approximately same distance and correspond to different transmitted fan beams having mutually different elevation angles in a predetermined rule.

* * * * *